(12) United States Patent
Kim

(10) Patent No.: US 9,606,384 B2
(45) Date of Patent: Mar. 28, 2017

(54) FLEXIBLE DISPLAY

(71) Applicant: SAMSUNG DISPLAY CO., LTD., Yongin, Gyeonggi-Do (KR)

(72) Inventor: Jeong Eun Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 332 days.

(21) Appl. No.: 14/226,480

(22) Filed: Mar. 26, 2014

(65) Prior Publication Data
US 2015/0146385 A1 May 28, 2015

(30) Foreign Application Priority Data
Nov. 25, 2013 (KR) .......... 10-2013-0143753

(51) Int. Cl.
*H05K 1/02* (2006.01)
*G02F 1/1333* (2006.01)

(52) U.S. Cl.
CPC .. *G02F 1/133308* (2013.01); *G02F 1/133305* (2013.01)

(58) Field of Classification Search
CPC ........ H05K 1/02; H05K 1/028; G06F 1/1652; G06F 1/1679
USPC ................................... 361/679.21
See application file for complete search history.

(56) References Cited

U.S. PATENT DOCUMENTS

| | | | |
|---|---|---|---|
| D750,064 S | * | 2/2016 | Yamazaki .......... D14/341 |
| 2010/0225875 A1 | * | 9/2010 | Wang .............. G02F 1/1339 349/160 |
| 2014/0003006 A1 | * | 1/2014 | Ahn .............. G06F 1/1679 361/749 |
| 2014/0307397 A1 | * | 10/2014 | Osako ............ H05B 33/02 361/749 |

FOREIGN PATENT DOCUMENTS

| | | |
|---|---|---|
| JP | 2003-280546 A | 10/2003 |
| KR | 10-2010-0091857 A | 8/2010 |
| KR | 10-2011-0006787 A | 1/2011 |
| KR | 10-2012-0034506 A | 4/2012 |

* cited by examiner

*Primary Examiner* — Eric Thomas
*Assistant Examiner* — Michael P McFadden
(74) *Attorney, Agent, or Firm* — Lewis Roca Rothgerber Christie LLP

(57) ABSTRACT

A flexible display includes a flexible display substrate, a first fixing part at a first side of the display substrate, and a second fixing part at a second side of the display substrate opposite to the first side. The first fixing part includes a plurality of first unit fixing parts arranged along the first side, and the second fixing part includes a plurality of second unit fixing parts arranged along the second side. A first folding part is between adjacent ones of the plurality of first unit fixing parts, and a second folding part is between adjacent ones of the plurality of second unit fixing parts. A plurality of first folding lines, each extending between the corresponding first folding part and the corresponding second folding part, are defined, and the display substrate is configured to be folded along at least one of the first folding lines.

16 Claims, 21 Drawing Sheets

FLEXIBLE DISPLAY

CROSS-REFERENCE TO RELATED APPLICATION

This application claims priority to and the benefit of Korean Patent Application No. 10-2013-0143753, filed on Nov. 25, 2013 in the Korean Intellectual Property Office, the disclosure of which is incorporated herein by reference in its entirety.

BACKGROUND

1. Field

Aspects of embodiments of the present invention are directed toward a flexible display.

2. Description of the Related Art

Currently, the display market is rapidly being dominated by flat panel displays (FPDs) that can be easily made to have a large area and can be made thinner and lighter.

Examples of the FPDs include liquid crystal displays (LCDs), plasma display panels (PDPs), and organic light-emitting displays (OLEDs). Because these conventional LCDs, PDPs, and OLEDs use a glass substrate, they are lacking in flexibility, and thus, have limited applications and uses.

In this regard, flexible displays that can be bent because they use a flexible substrate formed of a flexible material (e.g., plastic, foil, etc.) instead of a glass substrate are being actively developed as next-generation displays.

Flexible displays have a high degree of freedom of transformation compared with conventional displays. That is, flexible displays can be bent, folded, or rolled. However, the freedom of transformation can cause problems; for example, the flexibility can inconvenience a user in using or viewing a flexible display. Therefore, controlling transformation of the flexible display is an important factor to increase the ease of use of the flexible display. Accordingly, various technological attempts are being made to control a change in the shape of a flexible display or maintain the changed shape of the flexible display.

SUMMARY

Aspects of embodiments of the present invention are directed toward a flexible display capable of changing its shape and maintaining its changed shape.

Aspects of embodiments of the present invention are also directed toward a flexible display capable of transforming into various shapes.

Aspects of embodiments of the present invention are also directed toward a flexible display capable of being folded, bent, and/or rolled However, aspects of embodiments of the present invention are not restricted to those set forth herein. The above and other aspects of the present invention will become more apparent to one of ordinary skill in the art to which the present invention pertains by referencing the detailed description of the present invention given below.

According to an embodiment of the present invention, a flexible display includes a flexible display substrate, a first fixing part at a first side (e.g., a left side) of the display substrate, and a second fixing part at a second side (e.g., a right side) of the display substrate opposite to (e.g., facing) the first side, wherein the first fixing part includes a plurality of first unit fixing parts arranged along the first side, the second fixing part includes a plurality of second unit fixing parts arranged along the second side, a first folding part is between adjacent ones of the plurality of first unit fixing parts, a second folding part is between adjacent ones of the plurality of second unit fixing parts, a plurality of first folding lines, each extending between the corresponding first and second folding parts, are defined, and the display substrate is configured to be folded along at least one of the first folding lines.

BRIEF DESCRIPTION OF THE DRAWINGS

The above and other aspects and features of embodiments of the present invention will become more apparent by describing in detail example embodiments thereof with reference to the attached drawings, in which:

FIG. 7b is a plan view of a first surface and a second surface of the display shown in FIG. 7a.

FIG. 7c is a cross-sectional view illustrating the operation of the display shown in FIG. 7a.

FIG. 7d is a plan view of the display according to the embodiment shown in FIG. 7a.

DETAILED DESCRIPTION

Figure 1:
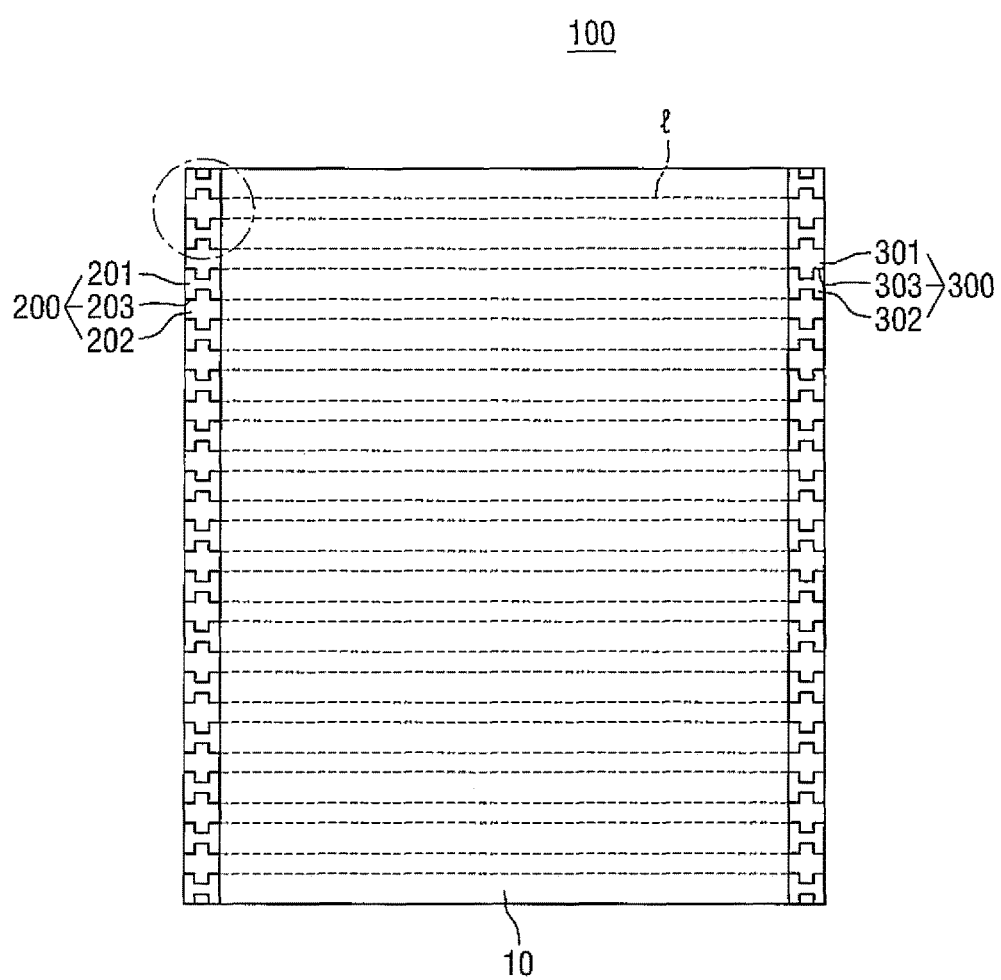
FIG. 1 is a plan view of a display according to an embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter, but may be implemented in diverse forms. The matters defined in the description, such as the detailed construction and elements, are details provided to assist those of ordinary skill in the art in a comprehensive understanding of the invention, and the present invention is defined within the scope of the appended claims and their equivalents.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on", "directly connected to", or "directly coupled to" another element or layer, there are no intervening elements or layers present. As used herein, the term "and/or" includes any and all combinations of one or more of the associated listed items. Further, the use of "may" when describing embodiments of the present invention relates to "one or more embodiments of the present invention".

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The same reference numerals designate the same elements.

Hereinafter, embodiments of the present invention will be described with reference to the attached drawings.

Figure 2:
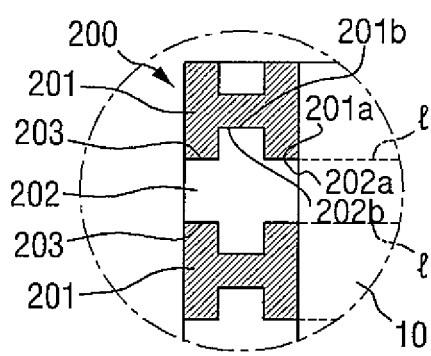
FIG. 2 is an enlarged view of portion 'A' of FIG. 1.

FIG. 1 is a plan view of a flexible display 100 according to an embodiment of the present invention. FIG. 2 is an enlarged view of portion 'A' of FIG. 1.

Referring to FIGS. 1 and 2, the flexible display 100 according to the current embodiment includes a flexible display substrate 10, a first fixing part 200 disposed at a first side (e.g., a left side) of the display substrate 10, and a second fixing part 300 disposed at a second side (e.g., a right side) of the display substrate 10 which is opposite to (e.g., faces) the first side. The first fixing part 200 includes a plurality of first unit fixing parts arranged along the first side, and the second fixing part 300 includes a plurality of second unit fixing parts arranged along the second side. A first folding part 203 is formed between adjacent ones of the plurality of first unit fixing parts, and a second folding part 303 is formed between adjacent ones of the plurality of second unit fixing parts. A plurality of folding lines e, each extending between (e.g., connecting) the corresponding first folding part 203 and the corresponding second folding part 303 which correspond to each other, are defined. The display substrate 10 may be folded along at least one of the folding lines E.

The substrate 10 is where an image is displayed. The substrate 10 may be flexible. In other words, the display substrate 10 can be understood as a flexible substrate that can be bent, folded, and/or rolled. An example embodiment in which a display unit includes a flexible substrate will hereinafter be described in more detail. However, this is merely an example, and it is obvious that the scope of the present invention is not limited to this example.

The display substrate 10 may be formed of an insulating material. In an example embodiment, the substrate 10 may be formed of polyimide (PI). However, the material of the substrate 10 is not limited to polyimide. The display substrate 10 may be formed of a flexible plastic material or an equivalent material. The display substrate 10 may have a single layer structure. However, the structure of the display substrate 10 is not limited to the single layer structure. The display substrate 10 may also have a stacked structure of two or more layers.

A buffer layer may be disposed on the display substrate 10. The buffer layer may prevent penetration of impurity elements from the display substrate 10. In an example embodiment, the buffer layer may be formed of one or more materials selected from the group consisting of silicon oxide ($SiO_x$) and silicon nitride ($SiN_x$). However, the material of the buffer layer is not limited to the above examples. In another example embodiment, the buffer layer can be omitted.

A semiconductor layer may be formed on the buffer layer; and a gate insulating layer, which covers the buffer layer and the semiconductor layer, may be formed on the semiconductor layer. A gate wiring including a gate electrode, a gate line, and a gate pad may be disposed on the gate insulating layer. An interlayer insulating film may be disposed on the gate wiring, and a data wiring including a data line, a source/drain electrode, and a data pad may be disposed on the interlayer insulating film.

Further, the gate electrode, the source/drain electrode, and the semiconductor layer may together form one thin-film transistor (TFT). A plurality of pixels may be defined by the data line and the gate line, and at least one TFT may be disposed in each of the pixels.

An organic layer may be disposed on the data wiring. In an example embodiment, the organic layer may be a planarization layer.

A first electrode may be disposed on the organic layer. In an example embodiment, the first electrode may be, but is not limited to, an anode. The first electrode may be electrically coupled to (e.g., electrically connected to) the drain electrode by a via opening (e.g., a via hole) formed in the organic layer.

A pixel defining layer may be disposed on the first electrode. A contact opening (e.g., a contact hole), which partially exposes (that is, which exposes a portion of) the first electrode, may be formed in the pixel defining layer. An intermediate layer may be disposed at (e.g., in) the contact opening. The intermediate layer may include one or more layers selected from the group consisting of a hole injection layer, a hole transport layer, an organic light-emitting layer, an electron transport layer, and an electron injection layer.

A second electrode may be disposed on the intermediate layer and the pixel defining layer. In an example embodiment, the second electrode may be, but is not limited to, a cathode.

Until now, an embodiment in which an organic light-emitting display including the flexible display substrate 10 has been described. However, this case is merely an example, and the flexible display substrate 10 is not limited to being included in the organic light-emitting display. That is, any now available or realizable, depending on future technological developments, display technology may include the flexible display substrate 10 described herein.

In an example embodiment, the display substrate 10 may have, but is not limited to, a quadrilateral shape. In addition, an image may be displayed on (e.g., emitted from) a first surface and/or a second surface of the display substrate 10. In other words, an image may be displayed on (e.g., emitted from) only one surface of the display substrate 10 or on both surfaces (facing oppositely away from each other) of the display substrate 10.

The first fixing part 200 may be disposed at the first side of the display substrate 10, and the second fixing part 300 may be disposed at the second side of the display substrate 10 which is opposite to (e.g., faces) the first side. The first fixing part 200 and the second fixing part 300 may respectively couple (e.g., fix or engage) the first side and the second side of the display substrate 10 and maintain the shape of the display substrate 10.

In an example embodiment, the first fixing unit 200 and the second fixing unit 300 may be disposed at the first surface or the second surface of the display substrate 10. That is, the first fixing unit 200 and the second fixing unit 300 may be disposed along the edges of the first surface or the second surface of the display substrate 10.

The first fixing part 200 and the second fixing part 300 may include a plurality of unit fixing parts arranged along the first side and the second side of the display substrate 10. For example, the first fixing part 200 may include first unit fixing parts, and the second fixing part 300 may include second unit fixing parts. The first unit fixing parts may be arranged in a row along the first side of the display substrate 10, and the second unit fixing parts may be arranged in a row along the second side of the display substrate 10. However, the arrangement of the first unit fixing parts and the arrangement of the second unit fixing parts are not limited to the above example, and the first unit fixing parts and the second unit fixing parts may be respectively arranged in two or more rows.

The second unit fixing parts may be substantially identical to the first unit fixing parts. Therefore, the first unit fixing parts will mainly be described below. Each of the first unit fixing parts may include two sub-unit fixing parts 201 and 202. The two sub-unit fixing parts 201 and 202 are arranged along the first side of the display substrate 10 and have shapes different from each other. The two different sub-unit fixing parts 201 and 202 may be alternately arranged. In FIGS. 1 and 2, the two sub-unit fixing parts 201 and 202 having shapes different from each other are alternatively arranged. However, this is merely an example, and the arrangement of the sub-unit fixing parts 201 and 202 is not limited to this example.

The first unit fixing parts may be formed of plastic or an equivalent material. However, the present invention is not limited thereto, and the first unit fixing parts may be formed of metal or an equivalent material.

In an example embodiment in which the first unit fixing parts are formed of plastic, the first unit fixing parts may be flexible due to their material properties and/or thickness. However, the present invention is not limited thereto. In another example embodiment, the first unit fixing parts may also be rigid.

The first folding part 203 may be formed between adjacent first unit fixing parts. As described above, the second unit fixing parts may be substantially identical to the first unit fixing parts. Accordingly, the second folding part 303 may be formed between adjacent second unit fixing parts.

Specifically, the first folding part 203 may be formed between one sub-unit fixing part and another adjacent sub-unit fixing part (e.g., between adjacent sub-unit fixing parts 201 and 202). In an example embodiment, the first folding part 203 may be formed along a coupling portion between one sub-unit fixing part and another adjacent sub-unit fixing part. However, the position of the first folding part 203 is not limited thereto. In an example embodiment, the first folding part 203 may be shaped like a line that extends from an outer side of the first fixing part 200 toward an inner side thereof. That is, the first fixing part 200 can be bent or folded along the line-shaped first fixing part 200.

The second fixing part 300 may be placed to correspond to the first fixing part 200. That is, the second unit fixing parts of the second fixing unit 300 may be placed to correspond respectively to the first unit fixing parts of the first fixing part 200. Accordingly, the second folding parts 303 of the second fixing part 300 may be placed to correspond respectively to the first folding parts 203 of the first fixing part 200.

One or more lines, each extending between (e.g., connecting) the first folding part 203 and the second folding part 303 which correspond to each other, may define one or more first folding lines l on the display substrate 10.

The first folding lines l may be substantially perpendicular to the first and second sides of the display substrate 10. In an example embodiment in which the first folding part 203 and the second folding part 303 are line-shaped, the first and second folding parts 203 and 303 which correspond to each other and a first folding line l which extends between (e.g., connects) the first and second folding parts 203 and 303 may be arranged in a row. That is, the first folding part 203, the second folding part 303, and the first folding line f which correspond to one another may be arranged along (e.g., may lie on) the same straight line. Each of the first folding part 203 and the second folding part 303 may be provided in a plurality of separate units. Accordingly, a plurality of first folding lines l may be formed on the display substrate 10.

The display substrate 10 can be bent or folded along the first folding lines l. In other words, the display substrate 10 can be bent or folded along at least one of the first folding lines l.

In FIGS. 1 and 2, each of the first and second unit fixing parts includes sub-unit fixing parts having shapes different from each other. This will be described in further detail below.

For ease of description, the first unit fixing parts will be mainly described. A sub-unit fixing part shaped like an 'H' will be referred to as a first sub-unit fixing part 201, and a sub-unit fixing part shaped like a '+' will be referred to as a second sub-unit fixing part 202.

As described above, the first sub-unit fixing part 201 and the second sub-unit fixing part 202 may be alternately arranged. That is, the first sub-unit fixing part 201 and the second sub-unit fixing part 202 may be arranged sequentially in this order. In addition, this order may be repeated one or more times.

In an example embodiment, both sides of the first sub-unit fixing part 201 may each have a base surface and a concave portion which is recessed from the base surface. For ease of description, the base surface of the first sub-unit fixing part 201 will be referred to as a first base surface 201a. That is, respective sides of the first sub-unit fixing part 201 may each have a concave portion 201b which is recessed from the first base surface 201a by a distance (e.g., by a predetermined distance). In an example embodiment, the concave portion 201b may be disposed at the middle of the first base surface 201a. However, this is merely an example, and the position of the concave portion 201b is not limited to this example. In FIGS. 1 and 2, the concave portion 201b is rectangular. However, the shape of the concave portion 201b is not limited to the rectangular shape, and the concave portion 201b may be, for example, spherical or oval in shape.

Respective sides of the second sub-unit fixing part 202 may each have a base surface and a convex portion 202b which protrudes from the base surface so as to correspond to the concave portion 201b of the first sub-unit fixing part 201. For ease of description, the base surface of the second sub-unit fixing part 202 will be referred to as a second base surface 202a. Respective sides of the second sub-unit fixing part 202 may each have the convex portion 202b which protrudes from the second base surface 202a by a distance (e.g., by a predetermined distance). In an example embodiment, the convex portion 202b may be disposed at the middle of the second base surface 202a. However, the position of the convex portion 202b is not limited to this example. The convex portion 202b may be placed at a position corresponding to the position of the concave portion 201b of the first sub-unit fixing part 201. That is, the convex portion 202b may be inserted into the concave portion 201b of the first sub-unit fixing part 201. To this end, the convex portion 202b may have a shape corresponding to the shape of the concave portion 201b of the first sub-unit fixing part 201. In FIGS. 1 and 2, the convex portion 202b is shaped like a rectangular parallelepiped. However, the shape of the convex portion 202b is not limited to the rectangular parallelepiped, and the convex portion 202b may be, for example, spherical or oval.

The second sub-unit fixing part 202 may be disposed adjacent to one side or both sides of the first sub-unit fixing part 201. In an example embodiment, the second sub-unit fixing part 202 disposed adjacent to the first sub-unit fixing part 201 may be coupled to the first sub-unit fixing part 201 in a foldable or bendable way (that is, the second sub-unit fixing part 202 may be foldably or bendably coupled to the first sub-unit fixing part 201). In other words, in an example embodiment, any coupling method (e.g., hinge coupling)—that can foldably or bendably couple the first sub-unit fixing part 201 and the second sub-unit fixing part 202—may be used (utilized).

In an example embodiment, a coupling portion may be arranged along (e.g., may lie on) the same line as the first folding part 203. That is, each first unit fixing part including the first sub-unit fixing part 201 and the second sub-unit fixing part 202 can be folded or bent along the first folding part 203. In an example embodiment, the first base surface 201a of the first sub-unit fixing part 201 and the second base surface 202a of the second sub-unit fixing part 202 may be foldably coupled to each other. That is, the first folding part 203 may be arranged on (e.g., may lie on) the same plane with a contact surface between the first base surface 201a and the second base surface 202a.

As described above, the convex portion 202b of the second sub-unit fixing part 202 may be inserted into the concave portion 201b of the first sub-unit fixing part 201. That is, the concave portion 201b of the first sub-unit fixing part 201 and the convex portion 202b of the second sub-unit fixing part 202 may be engaged with each other. However, the convex portion 202b and the concave portion 201b may not be coupled to each other. That is, the concave portion 201b and the convex portion 202b may be separably in contact with each other. The above structure enables the first fixing part 200 and the second fixing part 300 to be folded along the first folding part 203 and the second folding part 303, respectively. This will be further described later.

The operation of the display 100 according to the current embodiment will now be described in further detail with reference to FIGS. 3 through 7.

Figure 3:
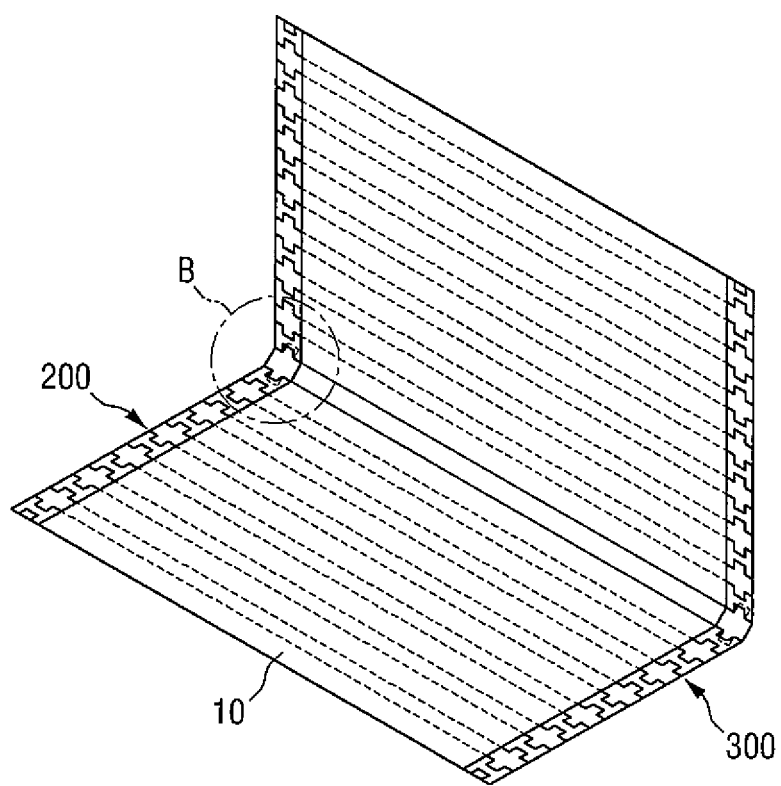
FIG. 3 is a schematic perspective view of the display shown in FIG. 1.
Figure 4:
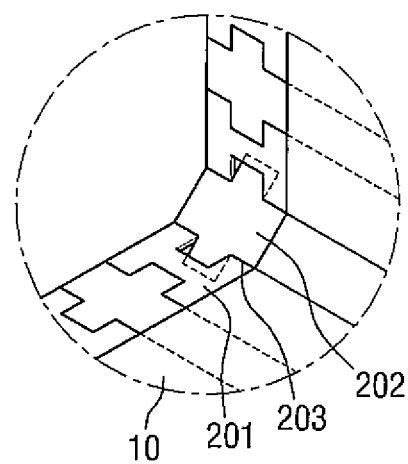
FIG. 4 is an enlarged view of portion 'B' of FIG. 3.
Figure 5:
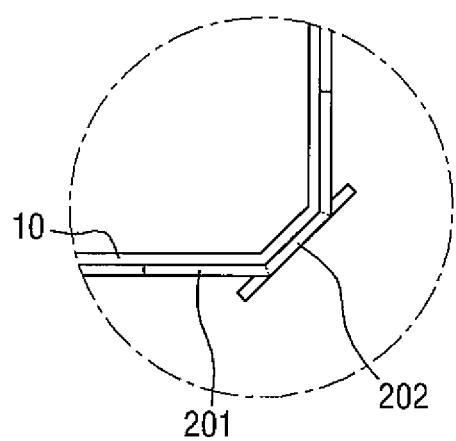
FIG. 5 is a partial cross-sectional view of FIG. 3.
Figure 6:
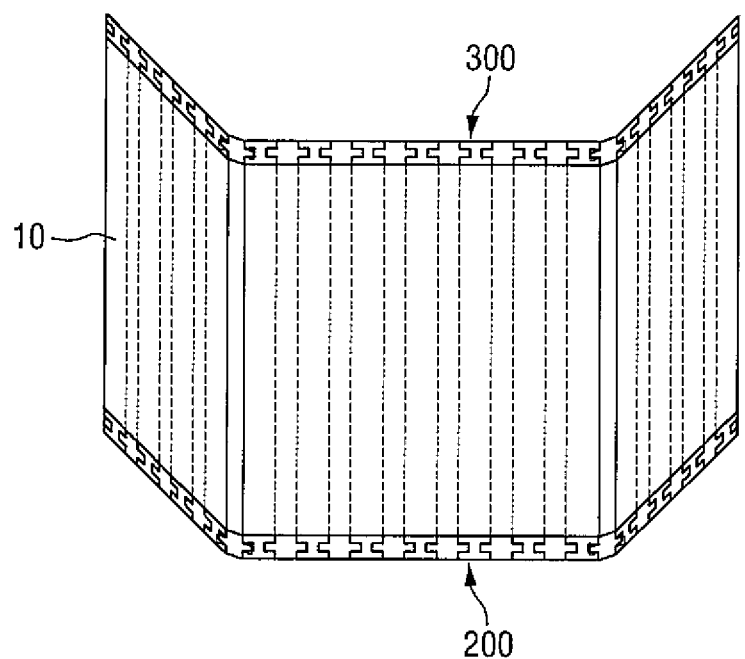
FIG. 6 is a schematic perspective view of the display shown in FIG. 1.
Figure 7:
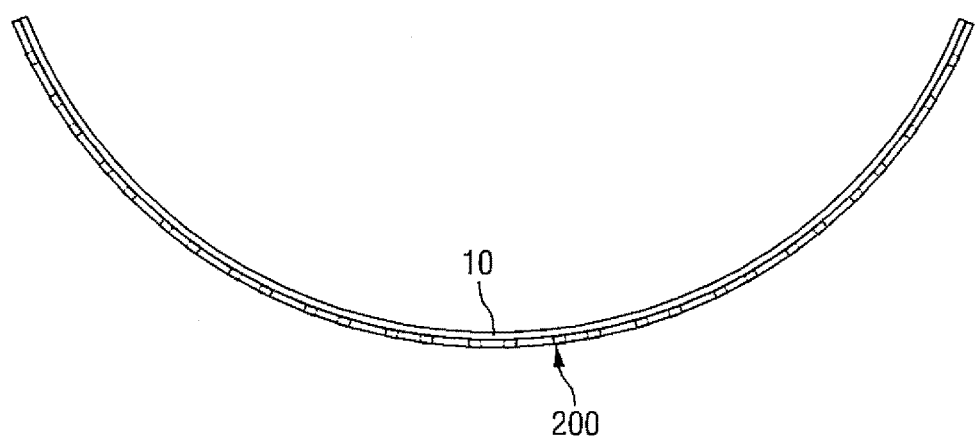
FIG. 7 is a side view of the display shown in FIG. 1.

FIG. 3 is a schematic perspective view of the display 100 shown in FIG. 1. FIG. 4 is an enlarged view of portion 'B' of FIG. 3. FIG. 5 is a partial cross-sectional view of FIG. 3. FIG. 6 is a schematic perspective view of the display 100 shown in FIG. 1. FIG. 7 is a side view of the display 100 shown in FIG. 1.

Referring to FIG. 3, the display 100 according to the current embodiment can be folded or bent along any one or more of the first folding lines l. In FIG. 3, the display 100 according to the current embodiment is bent along two adjacent first folding lines l, that is, a pair of first folding lines l.

As described above, the first base surface 201a of the first sub-unit fixing part 201 and the second base surface 202a of the second sub-unit fixing part 202 may be foldably or bendably coupled to each other, and the concave portion 201b of the first sub-unit fixing part 201 and the convex portion 202b of the second sub-unit fixing part 202 may be separably engaged with (e.g., separably in contact with) each other. In this case, when the display 100 is folded along a first folding line e by an external force applied to the display 100, the first fixing part 200 and the second fixing part 300 may be bent along the first folding part 203 and the second folding part 303. When the first fixing part 200 and the second fixing part 300 are bent, an inner end of the concave portion 201b of the first sub-unit fixing part 201 may separate from an outer end of the convex portion 202b of the second sub-unit fixing part 202. That is, when the outer end of the convex portion 202b of the second sub-unit fixing part 202 ascends or descends, the inner end of the concave portion 201b of the first sub-unit fixing part 201 may descend or ascend, respectively. That is, the inner end of the concave portion 201b of the first sub-unit fixing part 201 and the outer end of the convex portion 202b of the second sub-unit fixing part 202 may move in directions away from each other. Even in this case, inner side surfaces of the concave portion 201b of the first sub-unit fixing part 201 and outer side surfaces of the convex portion 202b of the second sub-unit fixing part 202 may at least partially contact each other. That is, the inner side surfaces of the concave portion 201b of the first sub-unit fixing part 201 and the outer side surfaces of the convex portion 202b of the second sub-unit fixing part 202 may partially contact each other to generate a frictional force, and the frictional force may keep or maintain the display 100 in a changed shape (e.g., folded or bent).

When the display 100 is folded along two adjacent first folding lines l as in the embodiment shown in FIGS. 4 and 5, the outer ends of the convex portions 202b disposed respectively on both sides of the second sub-unit fixing part 202 may be separated from the inner ends of the concave portions 201b of two adjacent first sub-unit fixing parts 201. That is, the outer ends of the convex portions 202b may move in a direction away from the inner ends of the concave portions 201b of the two adjacent first sub-unit fixing parts 201.

Accordingly, the display 100 may be bent along coupling portions of the second sub-unit fixing part 202 to the two adjacent first sub-unit fixing parts 201, that is, along two first folding lines l defined by the first and second folding parts 203 and 303.

Referring to FIG. 6, the display 100 according to the current embodiment may be folded along a plurality of first folding lines l. In FIG. 6, the display 100 is folded along four first folding lines l, that is, two adjacent pairs of first folding lines l.

Because the operation of the first and second sub-unit fixing parts 201 and 202 according to the folding of the display 100 have been described above, a detailed description thereof may be omitted.

In FIG. 6, the display 100 is folded along four first folding lines l. However, the number of the first folding lines l is not limited to four, and the display 100 can be folded along one or more first folding lines l.

Referring to FIG. 7, the display 100 according to the current embodiment may be curved (e.g., gently curved) in an arc. That is, the display 100 according to the current embodiment may not only be bent or folded along one or more first folding lines l but may be gently bent in an arc when viewed as a whole. That is, if the display 100 is slightly bent along all of the first folding lines l, it may be shaped like a curve with a certain curvature.

Hereinafter, other embodiments of the present invention will be described. In the following embodiments, elements identical to those described above are indicated by like reference numerals, and a redundant description thereof may be omitted or given briefly.

Figure 7A:
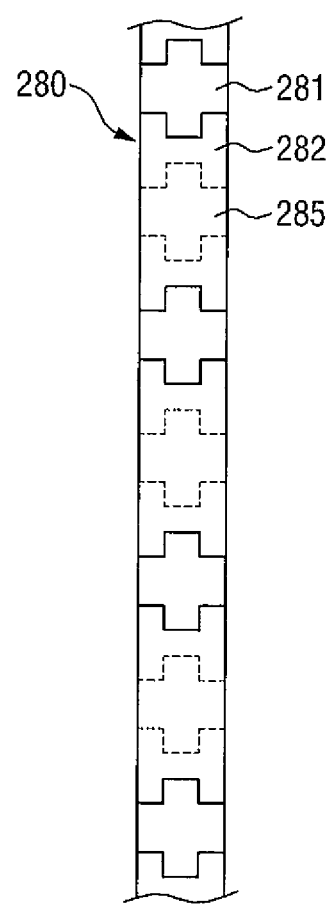
FIG. 7a is a partial enlarged view of a display according to another embodiment of the present invention.
Figure 7B:
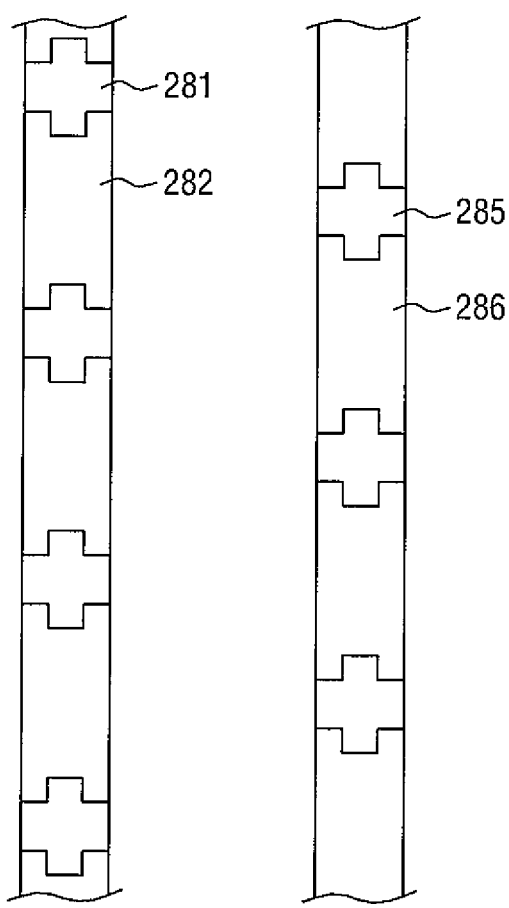
Figure 7C:
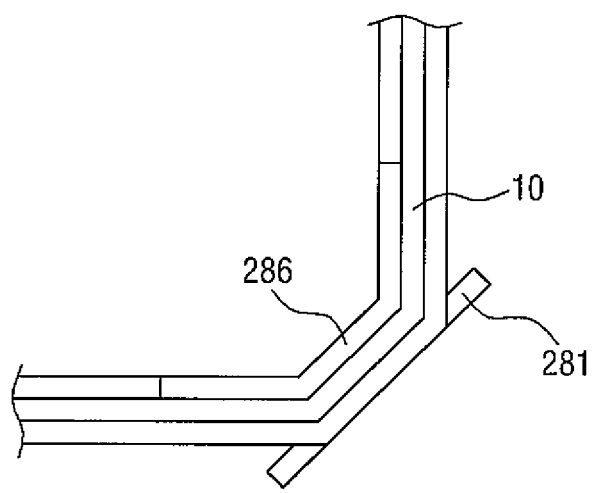
Figure 7C:
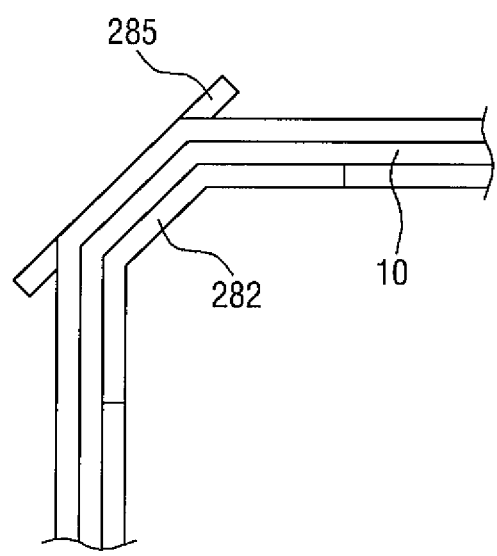
Figure 7D:
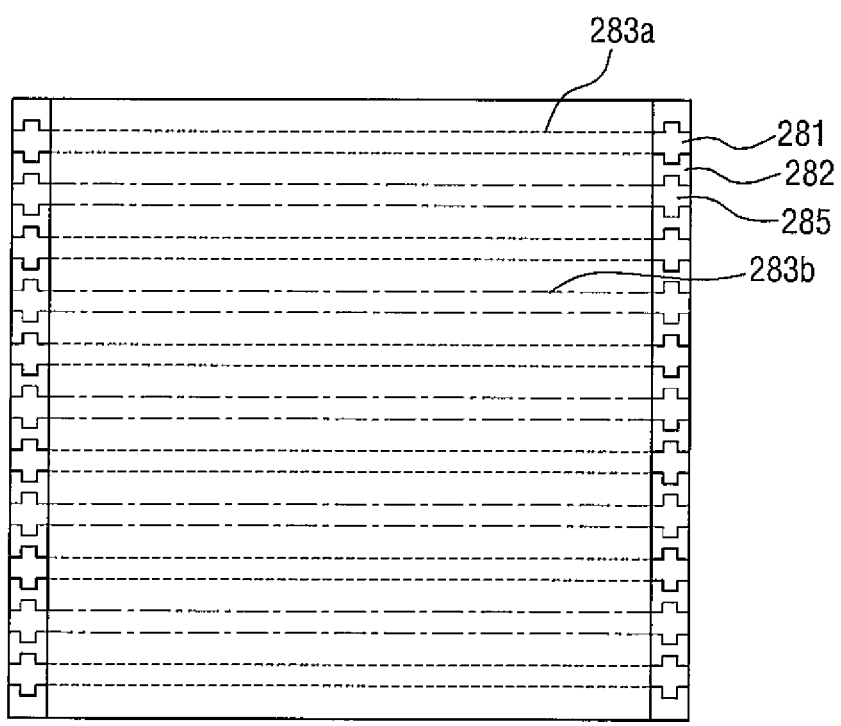

FIG. 7a is a partial enlarged view of a display according to another embodiment of the present invention. FIG. 7b is a plan view of a first surface and a second surface of the display shown in FIG. 7a. FIG. 7c is a cross-sectional view illustrating the operation of the display shown in FIG. 7a. FIG. 7d is a plan view of the display according to the embodiment shown in FIG. 7a.

Referring to FIGS. 7a through 7d, the display according to the current embodiment is different from the display 100 according to the embodiment shown in FIG. 1 in that unit fixing parts are disposed on the first surface and the second surface (facing oppositely away from the first surface) of the display and that a first sub-unit fixing part and a second sub-unit fixing part disposed on the first surface respectively face a second sub-unit fixing part and a first sub-unit fixing part disposed on the second surface.

The unit fixing parts may be disposed on the first surface and the second surface of the display. In an example embodiment in which each of the unit fixing parts includes a first sub-unit fixing part and a second sub-unit fixing part, a first sub-unit fixing part 281 and a second sub-unit fixing part 282 disposed on the first surface of the display may be alternately arranged with a first sub-unit fixing part 285 and a second sub-unit fixing part 286 disposed on the second surface of the display.

In other words, the first sub-unit fixing part 281 disposed on the first surface and the second sub-unit fixing part 286 disposed on the second surface may face each other. That is, a substrate may be between the first sub-unit fixing part 281 disposed on the first surface and the second sub-unit fixing part 286 disposed on the second surface. In other words, the first sub-unit fixing part 281 disposed on the first surface may face the second sub-unit fixing part 286 disposed on the second surface, and the second sub-unit fixing part 282 disposed on the first surface may face the first sub-unit fixing part 285 disposed on the second surface.

When the first sub-unit fixing part 281 and the second sub-unit fixing part 282 disposed on the first surface respectively face the second sub-unit fixing part 286 and the first sub-unit fixing part 285 disposed on the second surface, a folding line 283a disposed on the first surface of the display and a folding line 283b disposed on the second surface may be arranged parallel to and alternately with each other. That is, the folding line 283a formed on the first surface and the folding line 283b formed on the second surface may be parallel to each other but may not overlap each other.

Thus, the display may be folded along the folding line 283a formed on the first surface in a direction in which both ends of the first surface of the display become close to each other (e.g., a distance between both ends of the first surface of the display decreases or the display may be folded in a direction toward the first surface thereof). In addition, the display may be folded along the folding line 283b formed on the second surface in a direction in which both ends of the second surface of the display become close to each other (e.g., a distance between both ends of the second surface of the display decreases or the display may be folded in a direction toward the second surface thereof) (see FIGS. 7c and 7d).

Figure 8:
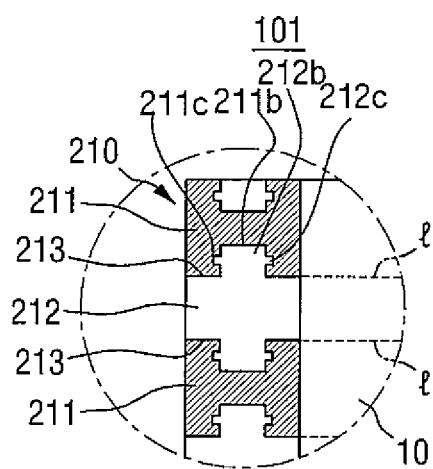
FIG. 8 is a partial enlarged view of a display according to another embodiment of the present invention.

FIG. 8 is a partial enlarged view of a display according to another embodiment of the present invention.

Referring to FIG. 8, the display according to the current embodiment is different from the display 100 according to the embodiment shown in FIG. 2 in that grooves 211c are recessed from each inner side surface of a concave portion 211b of a first sub-unit fixing part 211 by a distance (e.g., by a predetermined distance) and that protrusions 212c protrude from each outer side surface of a convex portion 212b of a second sub-unit fixing part 212.

The grooves 211c may be formed at the inner side surfaces of the concave portion 211b of the first sub-unit fixing part 211. The grooves 211c may be recessed from the inner side surfaces of the concave portion 211b by a distance (e.g., by a predetermined distance). When viewed from above, the grooves 211c may have a quadrilateral shape. However, the shape of the grooves 211c is not limited to the quadrilateral shape, and the grooves 211c may have a circular shape or a shape at least partially including a curve. In FIG. 8, one groove 211c is formed at each of the facing inner side surfaces of the concave portion 211b of the first sub-unit fixing part 211. However, the number of the grooves 211c is not limited to one, and two or more grooves 211c may be formed in each of the inner side surfaces of the concave portion 211b.

The protrusions 212c corresponding respectively to the grooves 211c formed at the inner side surfaces of the concave portion 211b of the first sub-unit fixing part 211 may protrude from the outer side surfaces of the convex portion 212b of the second sub-unit fixing part 212 by a distance (e.g., by a predetermined distance). The shape of the protrusions 212c may correspond to the shape of the grooves 211c. That is, the protrusions 212c may have a quadrilateral shape, a circular shape, or a shape at least partially includes a curve.

In addition, when a plurality of grooves 211c are formed in each of the inner side surfaces of the concave portion 211b, a plurality of protrusions 212c may be formed on the convex portion 212b to correspond to the grooves 211c.

As described above, the inner side surfaces of the concave portion 211b of the first sub-unit fixing part 211 at least partially contact the outer side surfaces of the convex portion 212b of the second sub-unit fixing part 212. Thus, a frictional force generated at contact areas between the inner side surfaces of the concave portion 211b of the first sub-unit fixing part 211 and the outer side surfaces of the convex portion 212b of the second sub-unit fixing part 212 may maintain the shape of the display. For example, the grooves 211c formed at the inner side surfaces of the concave portion 211b of the first sub-unit fixing part 211 may engage with (e.g., contact) the protrusions 212c formed in the convex portion 212b of the second sub-unit fixing part 212. That is, the protrusions 212c may be inserted into the grooves 211c, respectively. When the grooves 211c are engaged with (e.g., contact) the protrusions 212c, the frictional force between the inner side surfaces of the concave portion 211b of the first sub-unit fixing part 211 and the outer side surfaces of the convex portion 212b of the second sub-unit fixing part 212 may increase. Accordingly, a first fixing part 200 and a second fixing part 300 can firmly fix or maintain the shape or orientation of the display. That is, when the display is folded or bent, it may be firmly maintained in the changed shape by the first fixing part 200 and the third fixing part 300.

Figure 9:
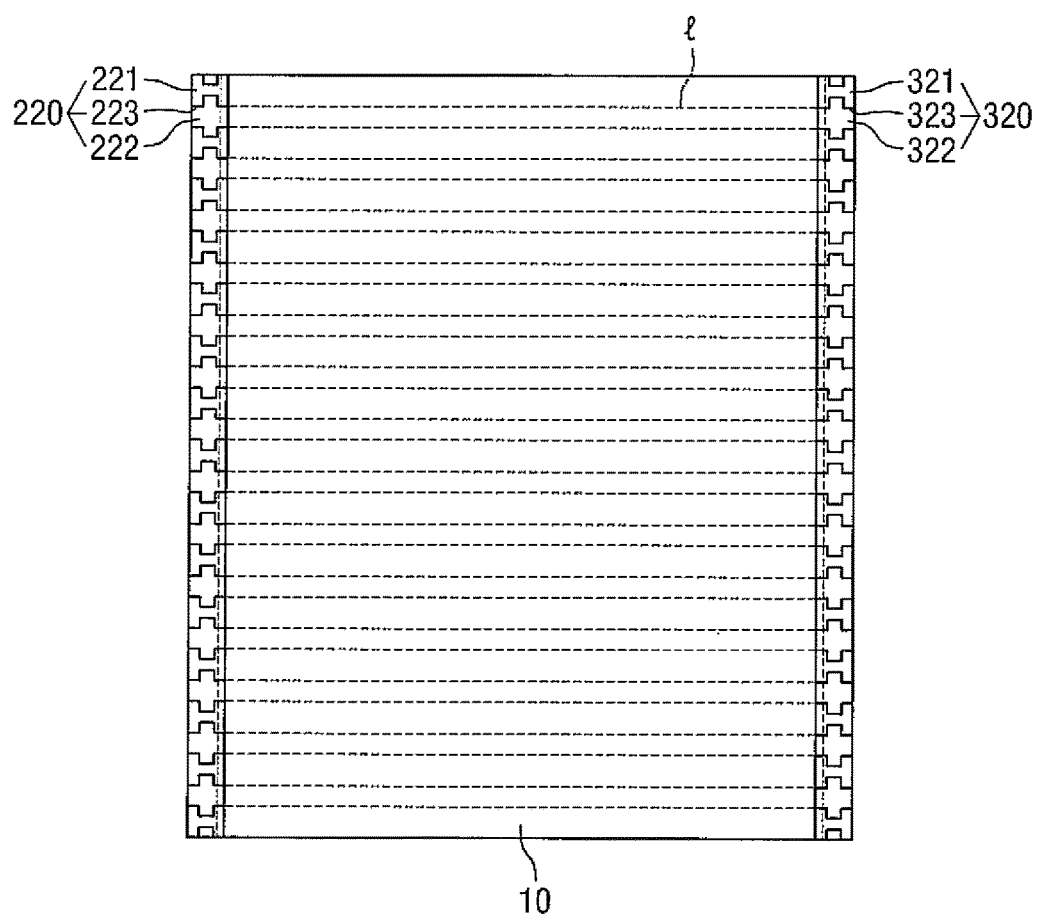
FIG. 9 is a plan view of a display according to another embodiment of the present invention.

FIG. 9 is a plan view of a display according to another embodiment of the present invention.

Referring to FIG. 9, the display according to the current embodiment is different from the display 100 according to the embodiment shown in FIG. 1 in that a portion of a first fixing part 200 and a portion of a second fixing part 300 are coupled to a display substrate 10.

As described above, the first fixing part 200 and the third fixing part 300 may be disposed on a first surface or a second surface of the display substrate 10. In this case, the entire first fixing part 200 and the entire second fixing part 300 may be disposed along the edges of the first surface or the second surface of the display substrate 10. However, the present invention is not limited thereto, and only a portion of the first fixing part 200 and/or only a portion of the second fixing part 300 may be coupled to the first surface or the second surface of the display substrate 10. In FIG. 9, a portion of the first fixing part 200 and a portion of the second fixing part 300 are coupled to the display substrate 10.

In an example embodiment, an inner side of the first fixing part 200 and an inner side of the second fixing part 300 may be coupled to the display substrate 10, and an outer side of the first fixing part 200 and an outer side of the second fixing part 300 may not be coupled to the display substrate 10. Furthermore, first and second sides of the display substrate 10, which are respectively coupled to the first and second fixing parts 200 and 300, may be located further in (e.g., further in toward the display substrate 10) than an inner side surface of a concave portion of a first sub-unit fixing part of each of the first and second fixing parts 200 and 300. In other words, the first and second sides of the display substrate 10 may be located further in than an outer side surface adjacent to the display substrate 10 among outer side surfaces of a convex portion of a second sub-unit fixing part of each of the first and second fixing parts 200 and 300. That is, the concave portions of the first sub-unit fixing parts and the convex portions of the second sub-unit fixing parts are each located outside of the display substrate 10.

When the first and second sides of the display substrate 10 are located further in than the inner side surfaces of the concave portion of the first sub-unit fixing part, the display substrate 10 can be freely folded toward both surfaces thereof. That is, the display substrate 10 can be folded or bent toward the first surface or the second surface thereof. That is, when the entire first fixing part 200 and the entire second fixing part 300 are placed on the first surface or the second surface of the display substrate 10, the display substrate 10, due to its structural characteristics, can be folded only toward a surface opposite to the surface on which the first fixing part 200 and the second fixing part 300 are placed. However, when the first and second sides of the display substrate 10 are located further in than the inner side surfaces of the concave portion of the first sub-unit fixing part, the display substrate 10 can be folded toward a surface on which the first fixing part 200 and the second fixing part 300 are placed or toward a surface opposite to the surface on which the first and second fixing parts 200 and 300 are placed.

Figure 10:
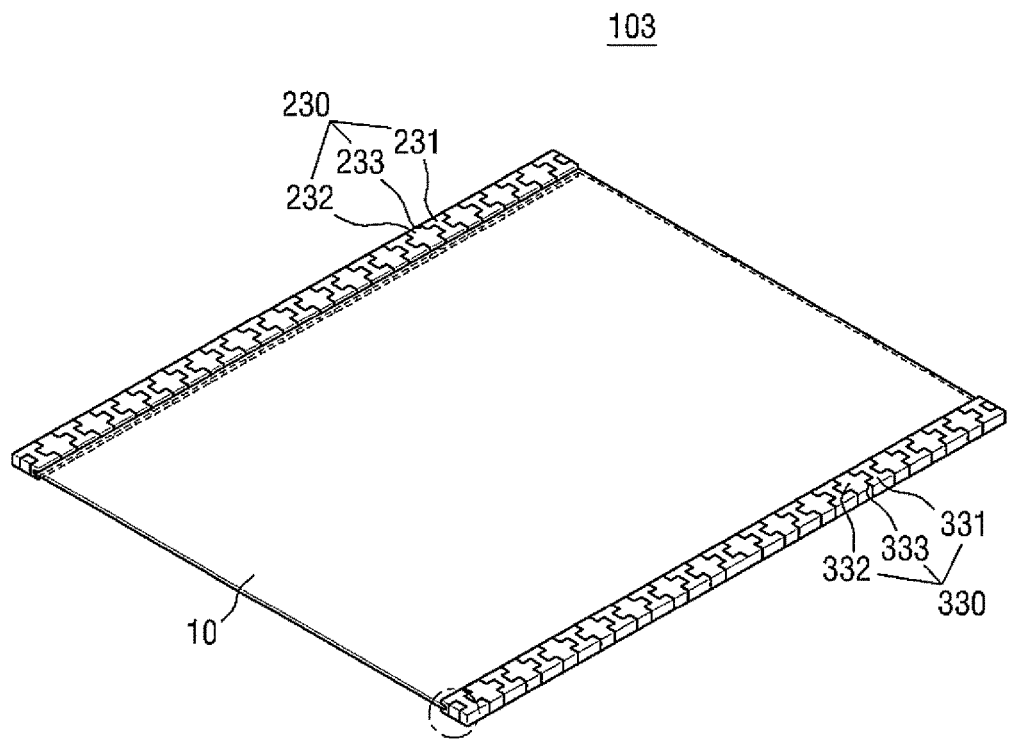
FIG. 10 is a perspective view of a display according to another embodiment of the present invention.
Figure 11:
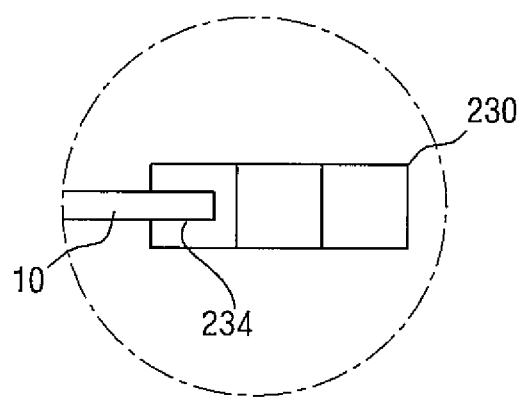
FIG. 11 is a partial cross-sectional view of the display shown in FIG. 10.

FIG. 10 is a perspective view of a display according to another embodiment of the present invention. FIG. 11 is a partial cross-sectional view of the display shown in FIG. 10.

Referring to FIGS. 10 and 11, the display according to the current embodiment is different from the display according to the embodiment shown in FIG. 9 in that an insertion groove 234, into which first and second sides of a display substrate 10 are inserted, is formed at respective side surfaces of a first fixing part 230 and a second fixing part 330 which face the display substrate 10.

The insertion groove 234 may be formed at each of a side surface of the first fixing part 230 and a side surface of the second fixing part 330 which face the first side and the second side of the display substrate 10, respectively. The insertion groove 234 may be recessed from each of the first fixing part 230 and the second fixing part 330 by a distance (e.g., by a predetermined distance). To have the first side and the second side of the display substrate 10 coupled in position (e.g., fixed in position), a height of the insertion groove 234 may be, but is not limited to, substantially equal to a thickness of the display substrate 10.

In an example embodiment, the first and second sides of the display substrate 10 which are each inserted into the respective insertion grooves 234 may be located further in than an inner side surface adjacent to the display substrate 10 among inner side surfaces of a concave portion of a first sub-unit fixing part 231 or 331 (that is, a convex portion of a second sub-unit fixing part 232 or 332 is outside of the insertion grooves 234). In this case, the display substrate 10 can be folded or bent toward a first surface or a second surface thereof as described above with reference to FIG. 9.

Figure 12:
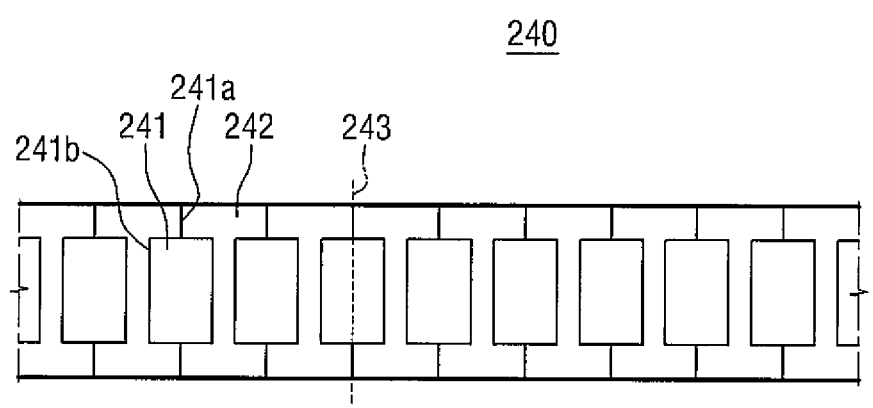
FIG. 12 is a partial enlarged view of a first fixing part of a display according to another embodiment of the present invention.

FIG. 12 is a partial, enlarged view of a first fixing part 240 of a display according to another embodiment of the present invention.

Referring to FIG. 12, the display according to the current embodiment is different from the display 100 according to the embodiment shown in FIG. 1 in that it includes an 'H'-shaped first sub-unit fixing part 241 and a quadrilateral second sub-unit fixing part 242.

For ease of description, the first fixing part 240 will be mainly described. This is because a second fixing part is substantially identical to the first fixing part 240 as described above.

Respective sides of the first sub-unit fixing part 241 may each have a concave portion 241b recessed from a base surface 241a. The base surface 241a of one first sub-unit fixing part 241 may be foldably coupled to the base surface 241a of another first sub-unit fixing part 241. Here, the coupling method or form is not limited to that described above in relation to the displays according to the previous embodiments of the present invention.

The second sub-unit fixing part 242 may be between one first sub-unit fixing part 241 and another adjacent first sub-unit fixing part 241. The second sub-unit fixing part 242 may have a quadrilateral shape. However, the shape of the second sub-unit fixing part 242 is not limited to the quadrilateral shape, and the second sub-unit fixing part 242 may also have a shape corresponding to the shape of the concave portion 241b of the first sub-unit fixing part 241.

In an example embodiment, outer side surfaces of the second sub-unit fixing part 242 may be hinge-coupled to inner side surfaces of the concave portion 241b of one first sub-unit fixing part 241 and inner side surfaces of the concave portion 241b of another first sub-unit fixing part 241. Accordingly, the display can be folded or bent toward a first surface or a second surface thereof. The hinge-coupling of the first and second sub-unit fixing parts 241 and 242 may define a plurality of first folding parts 243 in the first fixing part 240. Lines extending between (e.g., connecting) the first folding parts 243 and second folding parts corresponding respectively to the first folding parts 243 may define first folding lines a on a display substrate. Because this has been described above in relation to the displays according to the previous embodiments of the present invention, a detailed description thereof will be omitted.

Figure 13:
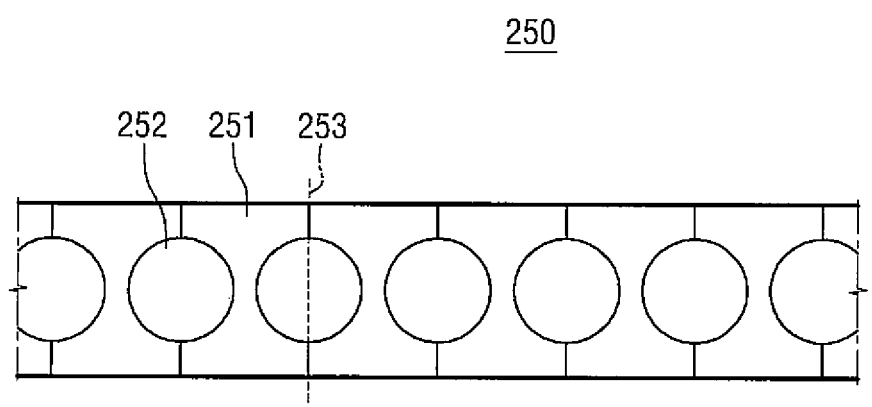
FIG. 13 is a partial enlarged view of a first fixing part of a display according to another embodiment of the present invention.

FIG. 13 is a partial, enlarged view of a first fixing part 250 of a display according to another embodiment of the present invention.

Referring to FIG. 13, the display according to the current embodiment is different from the display according to the embodiment shown in FIG. 12 in that the first fixing part 250 includes a circular second sub-unit fixing part 252 and that a first sub-unit fixing part 251 has a semi-circular concave portion.

As described above, the concave portion of the first sub-unit fixing part 251 may have a shape at least partially including a curve. When the concave portion of the first sub-unit fixing part 251 is semi-circular or arc-shaped, the second sub-unit fixing part 252 may be circular.

Other elements of the display according to the current embodiment may be substantially identical to the display according to the embodiment shown in FIG. 12, except that the second sub-unit fixing part 252 is circular and that the concave portion of the first sub-unit fixing part 251 is semi-circular. That is, a base surface of one first sub-unit fixing part 251 is foldably coupled to a base surface of another adjacent first sub-unit fixing part 251, thereby forming a first folding part 253.

Figure 14:
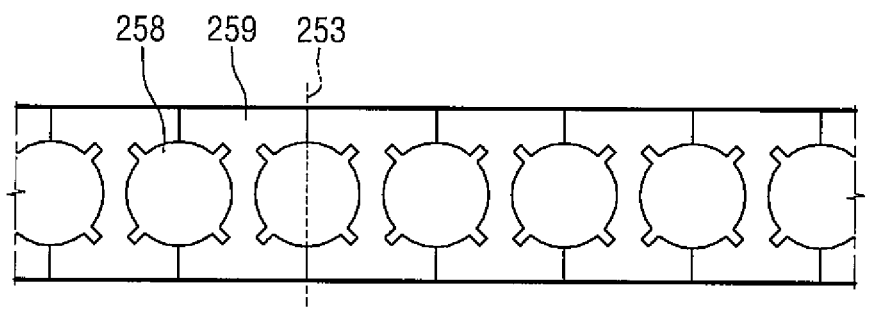
FIG. 14 is a partial enlarged view of a first fixing part of a display according to a modified example of the embodiment shown in FIG. 13.

FIG. 14 is a partial enlarged view of a first fixing part 257 of a display according to a modified example of the embodiment shown in FIG. 13.

Referring to FIG. 14, in the first fixing part 257 of the display according to the modified example of the embodiment shown in FIG. 13, one or more grooves may be formed at each inner side surface of a concave portion of a first sub-unit fixing part 259.

When the grooves are formed at the inner side surfaces of the concave portion of the first sub-unit fixing part 259, one or more protrusions may also be formed on a second sub-unit fixing part 258 to correspond respectively to the grooves. The grooves formed at the inner side surfaces of the concave portion of the first sub-unit fixing part 259 may be engaged with (e.g., may contact) the protrusions of the second sub-unit fixing part 258, respectively.

When the display is folded or bent along a first folding line, the inner side surfaces of the concave portion of the first sub-unit fixing part 259 and outer side surfaces of the second sub-unit fixing part 258 may at least partially contact each other, thereby generating a frictional force. The frictional force can maintain the display in the changed shape as described above. For example, the grooves formed at the inner side surfaces of the concave portion of the first sub-unit fixing part 259 and the protrusions formed on the second sub-unit fixing part 258 can increase the frictional force between the inner side surfaces of the concave portion of the first sub-unit fixing part 259 and the outer side surfaces of the second sub-unit fixing part 258. The increased frictional force can further increase the force with which the first fixing part 257 and a second fixing part couple (e.g., fix or engage) a first side and a second side of the display. In other words, the display can be maintained in the changed shape (e.g., folded, bent, etc.) more firmly.

Figure 15:
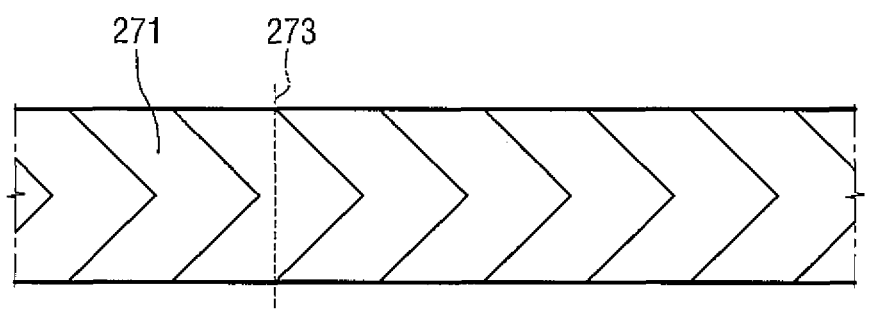
FIG. 15 is a partial enlarged view of a first fixing part of a display according to another embodiment of the present invention.

FIG. 15 is a partial enlarged view of a first fixing part 270 of a display according to another embodiment of the present invention.

Referring to FIG. 15, the display according to the current embodiment is different from the display 100 according to the embodiment shown in FIG. 1 in that a plurality of first unit fixing parts 271 having substantially the same shape are repeatedly arranged along the first fixing part 270.

As described above, the first fixing part 270 may include the first unit fixing parts 271 which have substantially the same shape and are repeatedly arranged. In an example embodiment, a first side of each of the first unit fixing parts 271 may have a concave portion, and a second side thereof may have a convex portion. The first side of one first unit fixing part 271 may contact the second side of another first unit fixing part 271. For example, the concave portion of one first unit fixing part 271 may be engaged with the convex portion of another adjacent first unit fixing part 271. In an example embodiment, both ends of the concave portion of the first unit fixing part 271 may be foldably coupled to both ends of the convex portion of another first unit fixing part 271. That is, a first folding part 273 may be defined as a line that extends between (e.g., connects) both ends of the convex portion of one first unit fixing part 271 which are coupled to both ends of the concave portion of another first unit fixing part 271.

The concave portion of one first unit fixing part 271 may be separably in contact with the convex portion of an adjacent first unit fixing part 271. That is, as the display is folded along a first folding line, a valley of the concave portion of one first unit fixing part 271 and a peak of the convex portion of another adjacent first unit fixing part 271 may move in directions away from each other. However, the concave portion of one first unit fixing part 271 and the convex portion of another adjacent first unit fixing part 271 at least partially contact each other, and a frictional force generated at the contact area between them can maintain the shape of the display.

Figure 16:
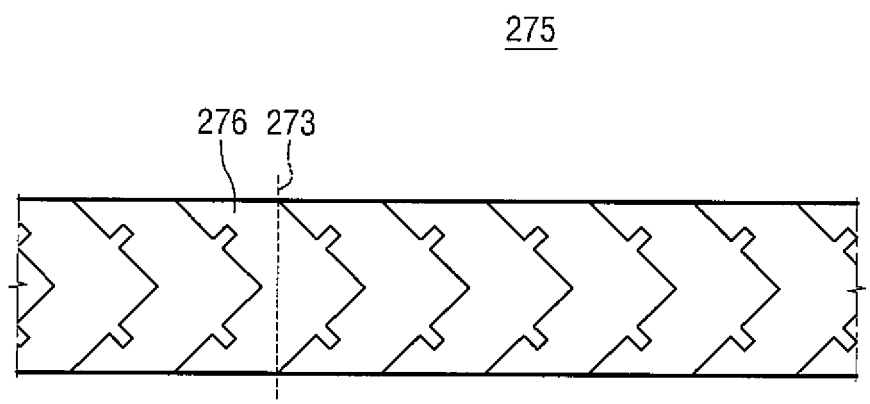
FIG. 16 is a partial enlarged view of a first fixing part of a display according to a modified example of the embodiment shown in FIG. 15.

FIG. 16 is a partial enlarged view of a first fixing part 275 of a display according to a modified example of the embodiment shown in FIG. 15.

Referring to FIG. 16, the display according to the modified example shown in FIG. 15 is different from the display according to the embodiment shown in FIG. 15 in that grooves are formed at a concave portion of a first unit fixing part 276 and protrusions are formed at a convex portion of another adjacent first unit fixing part 276.

As described above, when the display is folded or bent, the concave portion of a first unit fixing part 276 and the convex portion of another adjacent first unit fixing part 276 at least partially contact each other, and a frictional force generated at the contact area between them can maintain the display in the changed shape.

The grooves formed at the concave portion of a first unit fixing part 276 and the protrusions formed at the convex portion of another adjacent first unit fixing part 276 can increase the frictional force generated between the concave portion of the first unit fixing part 276 and the convex portion of the adjacent first unit fixing part 276. In other words, the force with which the first fixing part 275 fixes or maintains a position of a display substrate may increase. That is, the display can be maintained more firmly in the changed shape (e.g., folded, bent, etc.).

Figure 17:
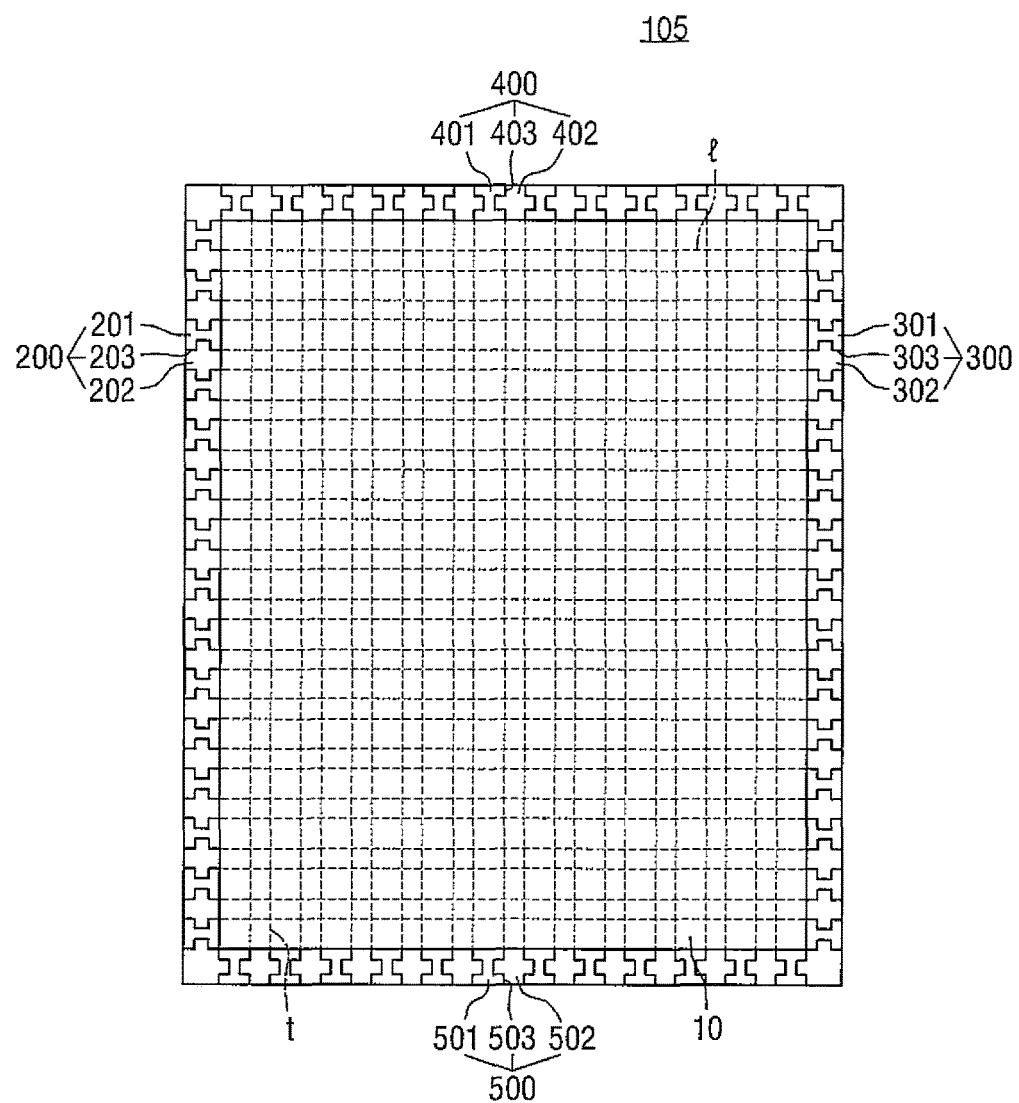
FIG. 17 is a plan view of a display according to another embodiment of the present invention.

FIG. 17 is a plan view of a display 105 according to another embodiment of the present invention.

Referring to FIG. 17, the display 105 according to the current embodiment is different from the display 100 according to the embodiment shown in FIG. 1 in that it further includes a third fixing part 400 and a fourth fixing part 500 which respectively couple (e.g., fix or engage) a third side and a fourth side adjacent to a first side and a second side of a display substrate 10.

As described above, the display substrate 10 may have a quadrilateral shape. That is, the display substrate 10 may be shaped like a quadrilateral including the first through fourth sides. In an example embodiment in which the display substrate 10 has the quadrilateral shape, the display 105 may further include the third fixing part 400 and the fourth fixing part 500 which respectively couple (e.g., fix or engage) the third side of the display substrate 10 and the fourth side facing the third side. The third fixing part 400 and the fourth fixing part 500 may be substantially identical to a first fixing part 200 and a second fixing part 300. That is, the third fixing part 400 and the fourth fixing part 500 may respectively include a plurality of third unit fixing parts and a plurality of fourth unit fixing parts, and each unit fixing part may include a plurality of sub-unit fixing parts.

In the display 105 which further includes the third fixing part 400 and the fourth fixing part 500, second folding lines t may be defined by (e.g., may extend between) the third fixing part 400 and the fourth fixing part 500. That is, the second folding lines t may be defined by lines, each extending between (e.g., connecting) a third folding part 403 of the third fixing part 400 to a corresponding fourth folding part 503 of the fourth fixing part 500. In an example embodiment, the second folding lines t may be, but are not limited to, substantially perpendicular to first folding lines l. If the first folding lines l and the second folding lines t are defined in the display 105, the display 105 can be folded or bent along at least one of the first folding lines l or at least one of the second folding lines t.

Aspects of embodiments of the present invention are directed toward at least one of the following features and characteristics.

That is, the shape of a flexible display can be easily changed.

In addition, a flexible display can be transformed into various shapes.

However, the features and characteristics of the present invention are not restricted to the one set forth herein. The above and other features and characteristics of the present invention will become more apparent to one of skill in the art to which the present invention pertains by referencing the claims and equivalents thereof.

What is claimed is:

1. A flexible display comprising:
    a flexible display substrate;
    a first fixing part at a first side of the display substrate; and
    a second fixing part at a second side of the display substrate opposite to the first side,
    wherein the first fixing part comprises a plurality of first unit fixing parts arranged along the first side, and the second fixing part comprises a plurality of second unit fixing parts arranged along the second side,
    wherein a first folding part is between adjacent ones of the plurality of first unit fixing parts, and a second folding part is between adjacent ones of the plurality of second unit fixing parts,
    wherein a plurality of first folding lines, each extending between the corresponding first folding part and the corresponding second folding part, are defined,
    wherein the display substrate is configured to be folded along at least one of the first folding lines, and
    wherein the entire area of the first folding part is between adjacent ones of the plurality of first unit fixing parts.

2. The flexible display of claim 1, wherein each of the plurality of first unit fixing parts and each of the plurality of second unit fixing parts respectively comprise a first sub-unit fixing part and a second sub-unit fixing part having shapes different from each other, and
    wherein the first sub-unit fixing part and the second sub-unit fixing part are alternately arranged along each of the first side and the second side.

3. The flexible display of claim 2, wherein respective sides of the first sub-unit fixing part have a first base surface and a concave portion recessed from the first base surface, and respective sides of the second sub-unit fixing part have a second base surface and a convex portion protruding from the second base surface, and
    wherein the concave portion of the first sub-unit fixing part and the convex portion of the second sub-unit fixing part adjacent to the first sub-unit fixing part engage each other.

4. The flexible display of claim 3, wherein the first base surface and the second base surface are foldably coupled to each other.

5. The flexible display of claim 3, wherein as the display substrate is bent along a first folding line, an inner end of the concave portion adjacent to the first folding line and an outer end of the convex portion adjacent to the first folding line move away from each other.

6. The flexible display of claim 3, wherein the first sub-unit fixing part has at least one groove, and the at least one groove is recessed from an inner side surface of the concave portion of the first sub-unit fixing part, and
    wherein the second sub-unit fixing part comprises at least one protrusion corresponding to the at least one groove, and the at least one protrusion protrudes from an outer side surface of the convex portion of the second sub-unit fixing part adjacent to the first sub-unit fixing part.

7. The flexible display of claim 3, wherein the first fixing part and the second fixing part are on a first surface and/or a second surface of the display substrate, the second surface facing oppositely away from the first surface, and an outer side of the first fixing part and an outer side of the second fixing part are outside the first side and the second side of the display substrate, respectively, and wherein an inner side surface adjacent to the display substrate of the concave portion of the first sub-unit fixing part at the first side of the display substrate is outside the first side of the display substrate, and an inner side surface adjacent to the display substrate of the concave portion of the first sub-unit fixing part at the second side of the display substrate is outside the second side of the display substrate.

8. The flexible display of claim 3, wherein the first fixing part and the second fixing part each have an insertion groove at a side surface thereof, the insertion grooves respectively face the first side and the second side of the display substrate, and the first side and the second side of the display substrate are inserted into the insertion groove of the first fixing part and the insertion groove of the second fixing part, respectively, and wherein an inner side surface adjacent to the display substrate of the concave portion of the first sub-unit fixing part at the first side of the display substrate is outside the first side of the display substrate, and an inner side surface adjacent to the display substrate of the concave portion of the first sub-unit fixing part at the second side of the display substrate is outside the second side of the display substrate.

9. The flexible display of claim 2, wherein the first sub-unit fixing part is 'H'-shaped, and the second sub-unit fixing part is '+'-shaped.

10. The flexible display of claim 2, wherein respective sides of the first sub-unit fixing part has a base surface and a concave portion recessed from the base surface, and wherein the base surface of the first sub-unit fixing part of one of the plurality of first unit fixing parts and the base surface of the first sub-unit fixing part of an adjacent one of the plurality of the first unit fixing parts are foldably coupled to each other, and the second sub-unit fixing part is between the first sub-unit fixing part of the one of the plurality of first unit fixing parts and the first sub-unit fixing part of the adjacent one of the plurality of first unit fixing parts.

11. The flexible display of claim 1, wherein the first fixing part and the second fixing part are on a first surface or a second surface of the display substrate, the second surface facing oppositely away from the first surface, and wherein an outer side of the first fixing part and an outer side of the second fixing part are outside the first side and the second side of the display substrate, respectively.

12. The flexible display of claim 1, wherein the first fixing part and the second fixing part each have an insertion groove in a side surface thereof, the insertion grooves respectively facing the first side and the second side of the display substrate, and wherein the first side and the second side of the display substrate are inserted into the insertion groove of the first fixing part and the insertion groove of the second fixing part, respectively.

13. The flexible display of claim 1, wherein a side of the first unit fixing part has a concave portion, and an other side of the first unit fixing part has a convex portion, and wherein the concave portion of the first unit fixing part and the convex portion of another adjacent first unit fixing part engage each other.

14. The flexible display of claim 1, further comprising a third fixing part and a fourth fixing part which respectively couple a third side and a fourth side adjacent to the first side and the second side of the display substrate, wherein the third fixing part comprises a plurality of third unit fixing parts arranged along the third side, the fourth fixing part comprises a plurality of fourth unit fixing parts arranged along the fourth side, a third folding part is between adjacent ones of the plurality of third unit fixing parts, and a fourth folding part is between adjacent ones of the plurality of fourth unit fixing parts, and a plurality of second folding lines, each extending between the corresponding third and the corresponding fourth folding part, are defined, and wherein the display substrate is configured to be folded along at least one of the first folding lines and at least one of the second folding lines.

15. The flexible display of claim 14, wherein the first folding lines and the second folding lines are perpendicular to each other.

16. A flexible display comprising:
a flexible display substrate;
a first fixing part at a first side of the display substrate, the first fixing part comprising a plurality of first unit fixing parts arranged along the first side and a first folding part between adjacent ones of the first unit fixing parts, each of the first unit fixing parts comprising a first sub-unit fixing part and a second sub-unit fixing part alternately arranged along the first side and having shapes different from each other; and a second fixing part at a second side of the display substrate opposite to the first side, the second fixing part comprising a plurality of second unit fixing parts arranged along the second side and a second folding part between adjacent ones of the second unit fixing parts, each of the second unit fixing parts comprising a first sub-unit fixing part and a second sub-unit fixing part alternately arranged along the second side and having shapes different from each other, wherein a plurality of first folding lines, each extending between the corresponding first folding part and the corresponding second folding part, are defined, the display substrate being configured to be folded along at least one of the first folding lines.

* * * * *